(No Model.)

G. W. COLLES, Jr.
ELECTRIC REGULATOR.

No. 550,484.            Patented Nov. 26, 1895.

WITNESSES:
A. C. Pfaff.
Emma E. DeJunice

INVENTOR
George W. Colles Jr.
BY
Edward P. Thompson
ATTORNEY.

(No Model.) 6 Sheets—Sheet 2.
G. W. COLLES, Jr.
ELECTRIC REGULATOR.

No. 550,484. Patented Nov. 26, 1895.

WITNESSES:
A. L. Pfaff
Emma C. Deghuee

INVENTOR
George W. Colles jr.
BY
Edward P. Thompson
ATTORNEY.

(No Model.) 6 Sheets—Sheet 5.

G. W. COLLES, Jr.
ELECTRIC REGULATOR.

No. 550,484. Patented Nov. 26, 1895.

WITNESSES:
A. C. Pfaff
Emma C. Deghuée

INVENTOR
George W. Colles jr.
BY
Edward P. Thompson
ATTORNEY.

(No Model.)  6 Sheets—Sheet 6.

G. W. COLLES, Jr.
ELECTRIC REGULATOR.

No. 550,484.  Patented Nov. 26, 1895.

WITNESSES:  INVENTOR
A. L. Pfaff.  George W. Colles, jr.
Emma C. Deghuee  BY Edward P. Thompson
  ATTORNEY.

UNITED STATES PATENT OFFICE.

GEORGE W. COLLES, JR., OF HOBOKEN, NEW JERSEY.

ELECTRIC REGULATOR.

SPECIFICATION forming part of Letters Patent No. 550,484, dated November 26, 1895.

Application filed February 4, 1895. Serial No. 537,321. (No model.)

*To all whom it may concern:*

Be it known that I, GEORGE W. COLLES, Jr., a citizen of the United States, and a resident of Hoboken, county of Hudson, and State of New Jersey, have invented certain new and useful Improvements in Electric Regulators, of which the following is a specification.

The present invention relates to electro-mechanical organizations for regulating a steam-engine coupled up with an electrical generator which feeds electric light or power circuits.

The object of the invention is automatically and as nearly as possible synchronously to supply more steam to the engine in direct proportion to the increase of work performed on the circuit and likewise similarly to cut off some of the steam from the engine in direct proportion to the decrease of load on the circuit.

In order to describe the invention in such a manner that those versed in the art may construct and use the same, the accompanying drawings are for the purpose of showing all the details.

Fig. 1ᵃ is a side elevation, on a large scale, of a detail not clearly represented in Figs. 1, 2, and 3, slightly modified. Figs. 1ᵇ, 1ᶜ, and 1ᵈ are different views of a portion of Fig. 1ᵃ, whereby the internal construction of that portion is clearly represented. Fig. 6ᵃ is a modification of the lever mechanism in the device shown in Figs. 4, 5, and 6.

Figure 1:
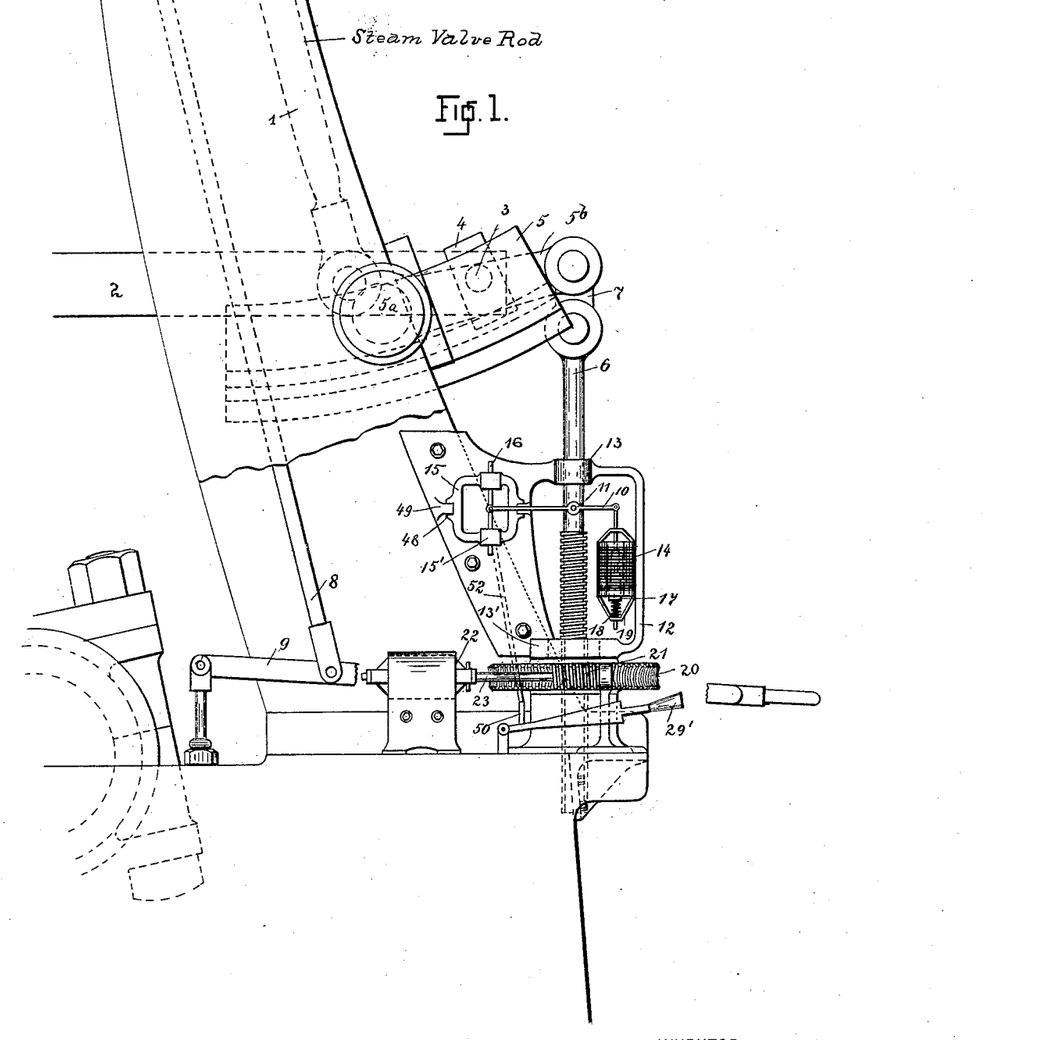
Figure 1 is a side elevation of the electro-mechanical device involving my invention combined with so much of a typical steam-engine as to be able to set forth the complete operation of the combination.
Figure 2:
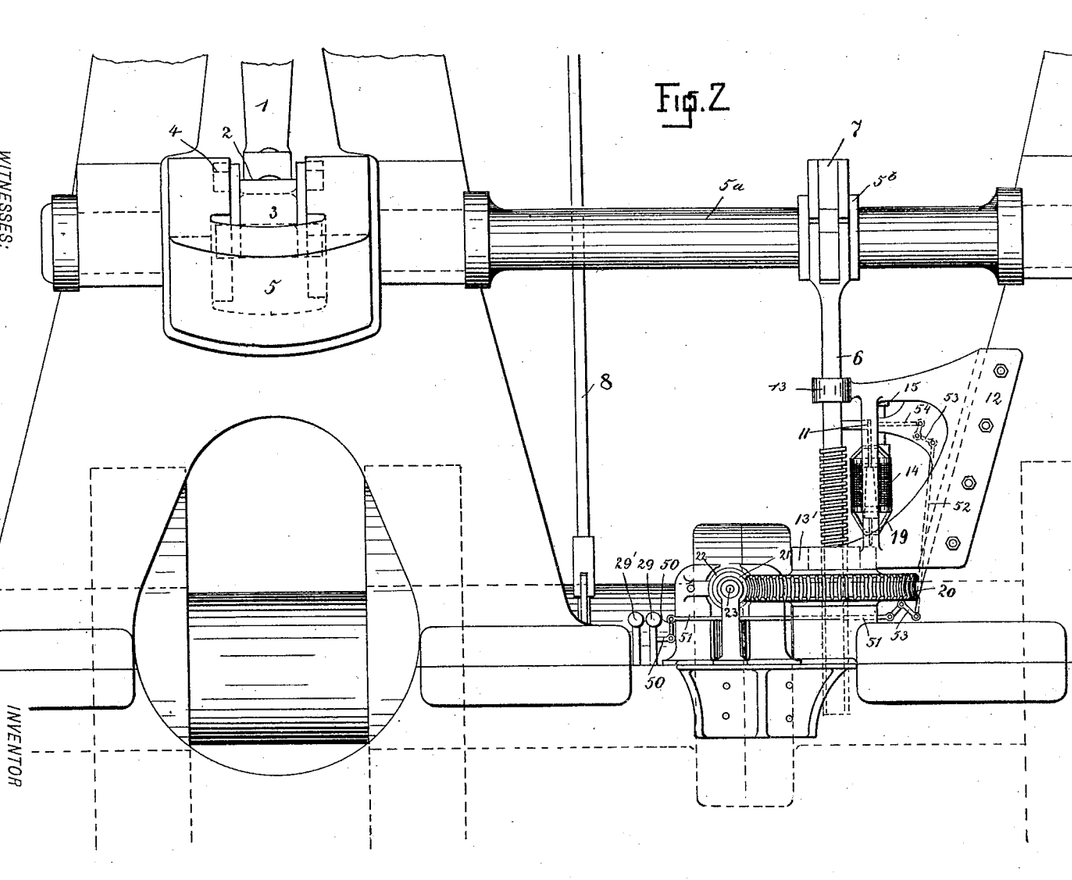
Fig. 2 is a front elevation of substantially the same construction as that shown in Fig. 1.

1 is the slide-valve rod for admitting and cutting off steam from the cylinder of a given steam-engine. The rod 1 is pivoted to the radius-rod 2, which is provided with a pin 3, mounted upon the slide 4, working in a slotted adjustable link 5. Link 5 is pivoted on trunnion 5ᵃ, which is adjusted by the lever 5ᵇ. The rod 6 is pivoted to the link 5ᵇ through an intermediate connecting-rod 7.

Any movement up or down of the rod 6 will change the adjustment of the link or guide 5, which will, through the intermediate mechanism above described, change the phase of the slide-valve rod 1.

Independently of the above-named mechanism there is a throttle-valve rod 8, operative by the handle 9 in the usual manner. The manipulation of this handle and of the rod 6 causes a complete regulation of the engine.

The steam-engine is supposed to be driving a dynamo. This is represented in the diagram described hereinafter.

Pivoted upon the rod 6 and carried thereby is a small lever 10, which is so pivoted as to oscillate in a vertical plane. The pivot is shown at 11. As hereinafter shown, the rod 10 is adjustable to and from the pivot 11.

12 is a supporting-frame attached to the frame of the steam-engine and forming a bearing 13 for the rod 6 and a bearing 13' for the worm-wheel and a support for a solenoid 14. This frame 12 also supports guide-rods for the frame 15 of the electric contact-boxes 15', hereinafter described in detail, the switch-rod for operating the contact-boxes being numbered 16. The solenoid 14 is upon one side of the rod 6 and the contact-boxes 15' upon the other side.

A core 17 is pivoted to one arm of the lever 10, so that as the core is attracted more or less into the solenoid or released therefrom the lever 10 will be moved respectively to a greater or less extent up and down. The motion of the core is resisted or assisted by the retractile spring 18, which is connected between the core and the frame 19, suspended from the solenoid. The rod 6 from a point below the pivot 11 is threaded to form a screw which gears with the worm-wheel 20. The worm 21, which engages with the worm-wheel 20, has operating connection with an electric motor 22. The connection between the two is the motor armature-shaft 23.

The operation of the above-named electromechanical devices may be described by stating that the motion of the motor one way or the other will elevate or depress the rod 6, which in turn will change the adjustment of the slide-valve rod 1. The motor 22 is included in and cut out of circuit through the medium of the solenoid 14 and the contact-boxes 15' and other intermediate and electrical elements, the solenoid being in a closed circuit with the dynamo which is driven by the steam-engine, in order to understand which Fig. 3 should be referred to particularly.

24 represents the steam-engine piston, which is diagrammatically shown as driving the dynamo 25, which supplies current for the working circuit 26, and which includes, as shown, the solenoid 14. If more translating devices than shown are included in parallel in the working circuit 26, it is evident the system is called upon for more current, and therefore the steam-engine should be automatically and quickly readjusted to give more power, it being supposed, for purposes of illustration, that the dynamo is a constant-potential electric generator. In consequence the solenoid-core 17 is attracted upward against the resistance of the spring 18 and the lever 10 is turned by the pivot 11 and lowers the switch-rod 16 until it closes the circuit at the terminals 27 and 28, which connect, respectively, with one pole of the armature 22' of the motor 22 and with the positive pole 28' of the field 22'' of the motor 22, it being assumed that the hand-switch 29 is in its left-hand position, Fig. 3, so as to connect the terminal 30 to the terminal 31. It will be noticed that in order to accomplish this result without interfering with the terminals 42 and 43 at the lower end of the switch-rod 16 the conductor 38 rests loosely upon the switch-rod and upon the shoulder 41.

Figure 3:
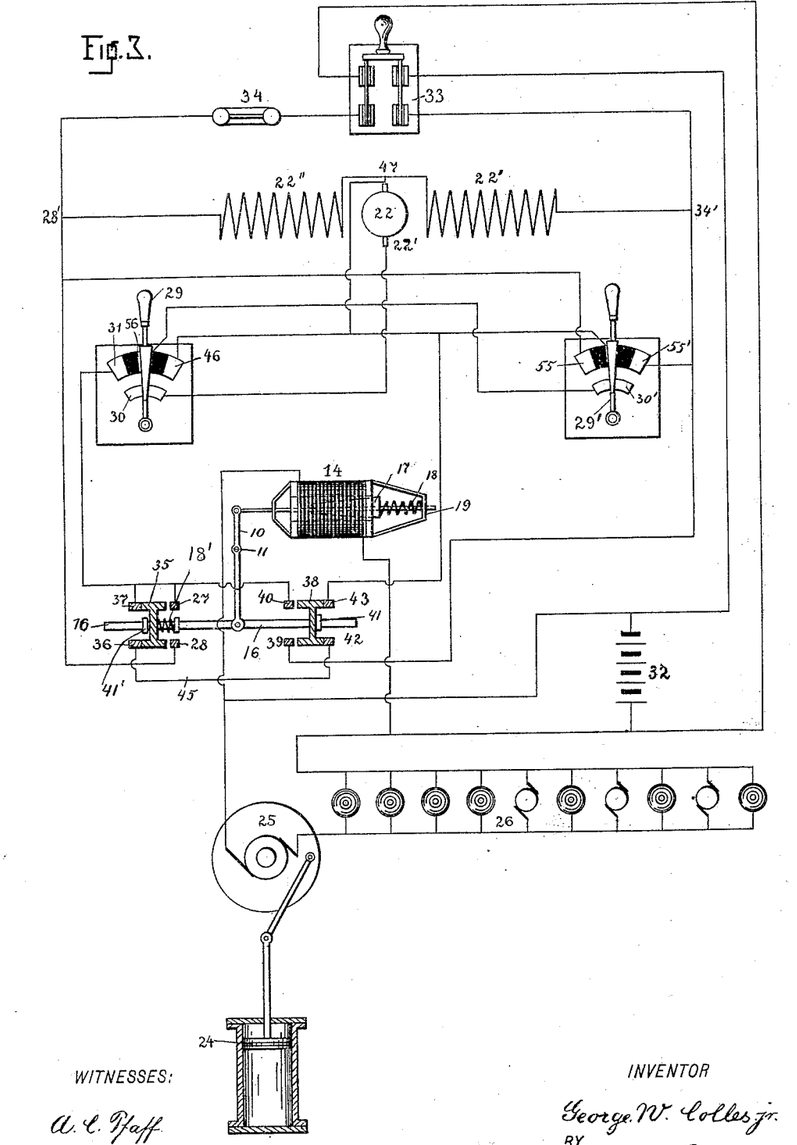
Fig. 3 is a diagram of the electrical connections involved in the devices shown in Figs. 1 and 2. The circuit-closers, switches, and other electrical features, as well as the connections and circuits, are also shown in Fig. 3.

The generator for the motor 22 is the secondary battery 32, charged by the dynamo 25 and connected to the double-pole switch or motor cut-out 33, of which the terminals are connected through a fuse 34 with the positive pole 28' of the motor 22 and the negative pole 34' of the motor. Because the motor 22 is now included in a closed circuit with the battery 32 it propels the worm-gearing and elevates the rod 6, thereby adjusting the slide-valve so as to give the steam-engine more steam. This process continues until the rod 6 elevates the pivot 11 against the resisting action of the power of the solenoid 14 and spring 18 until the switch-rod 16 interrupts the circuit at the terminals 27 and 28.

It should be explained that for satisfactory action of the mechanism the switch-rod 16 should be provided with an electrical yielding contact-piece 35, which is the conductor of the switch-rod 16, that connects the terminals 27 and 28. The spring 18' permits the conductor 35 (which rests loosely on the switch-rod 16 and against the shoulder 41') to yield when it comes against the stops 36 and 37, which serve the purpose also of electric terminals connecting in a manner as hereinafter described. In view of the spring 18' the rod 6, by the momentum of the electric motor 22, may continue to ascend even after the conductor 35 has come into contact with the terminals 36 and 37. The spring serves indirectly, also, to permit the lower conductor 38 on the switch-rod 16 to come in contact with an increasing pressure with the stops or terminals 39 and 40, which are connected up in the manner hereinafter set forth, the conductor 38 simply resting upon a rigid shoulder 41, except when it rests on the lower terminals 42 and 43, the manner of connecting which is hereinafter explained.

The interruption of the current at the terminals 27 and 28 and the short-circuiting of the motor 22 at the terminals 36 and 37 produce a limit of any further adjustment of the slide-valve, because the motor 22 stops. The terminals 36 and 42, located, respectively, above the conductor 35 and below the conductor 38, are common terminals being connected by the wire 45. The terminal 36 connects, through the terminal 42, with the conductor 38, with the terminal 43, and finally with the neutral pole 47 of the armature 22. The opposite terminal to 36—that is, terminal 37—connects with the terminal 31 of the hand-switch 29, to the terminal 30 of the same hand-switch, when the said switch is properly adjusted, and finally to the terminal 22'. In view of the closing of the terminal 36 and 37 thereof, the armature 22 becomes short-circuited, after which it very quickly stops for well-known reasons.

A current of the opposite nature from that described above—that is, a current of less strength—will permit the spring 18 to retract the core in the opposite direction—that is, downward—thereby tilting the lever 10 in the opposite direction and causing the switch-rod 16 to rise and the conductor 38 to electrically connect the terminals 39 and 40, so that the path of the current is, beginning with the conductor 38, to the terminal 40, to the terminal 31 of the hand-switch, to the terminal 30 of the same hand-switch, when the switch 29 is connecting them, thence to the armature-terminal 22', through the armature 22 to the terminal thereof 47, through the field-magnet to the terminal 28', through the fuse 34, through the motor cut-out switch 33, through the generator-battery 32, through the other poles of the double switch 33, and finally through the terminal 39 to the starting-point or conductor 38. This current causes the motor 22 to rotate in the opposite direction, and by means of the worm-gearing mechanism to lower the rod 6 and thereby to adjust the slide-valve in such a manner as to cut off more steam from the engine and reduce the power thereof.

The construction and operation of the hand-switch 29 are as follows.

In the upper position of the switch the automatic regulator is thrown into operation. In its next or middle position the hand-regulator 29' is thrown into circuit, and in its third or lowest position the armature is short-circuited. In regard to the hand-switch 29' the upper position is that in which the system is undergoing such a change in phase as to throw the link 5 upward. In its next or middle position the armature is short-circuited, it being supposed in this and in the preceding case that the switch 29 is in its middle position. When the switch 29' is in its third or lowest position the system will be so changed that the link 5 will move downward for the purpose hereinbefore stated. In this last-named position the other switch 29 should be in its middle position.

The frame 15 has side notches 48 opposite each other for receiving guide-bars 49, so that this frame may be moved parallel to itself for the purpose of permitting the rod 10 to leave its pivot 11, and therefore to permit the motor 22 to be worked by hand. The lever 29 connects with the frame 15 by a system of levers and bell-cranks for the purpose of accomplishing the above-named result. This system is shown by the bell-crank 50, which connects the handle 29 to the lever 51, which in turn connects with the frame 15 through the lever 52, and the bell-cranks 53 at opposite ends of the lever 52, and finally through the lever 54, which is the one that connects with the frame 15. In Fig. 1 the handle 29 is directly behind the handle 29'. The handle 29 is supposed to have been moved to the middle position, as shown in Figs. 1 and 2. The lever 29' is the hand device for regulating the electric motor and motion of the rod 6. By moving it to the left-hand contact 55, Fig. 3, or to the right-hand one 55' the motor may be put in circuit of a current of one or the other direction, so that the slide-valve rod 6 will be elevated or depressed. It will be noticed in the diagram Fig. 3 that the contact 55 for this purpose connects with the one pole of the battery 32 and the contact 55' with the other pole, while the common terminal 30' connects with the middle contact 56 of the switch whose handle is 29, which being in its middle position and on the contact 56 permits the current to pass through the electric motor 22. In other words, the current would pass from one pole of the battery 32 to the switch 33, then to the contact 55' if the handle 29' is in its lowest position, then to the contact 30', then to the contact 56 and to the contact 30, then to the pole 22' of the armature of the motor 22, then to the terminal 28' of the field-magnet of the same motor, then to the switch 33, and then to the other pole of the battery.

Figure 4:
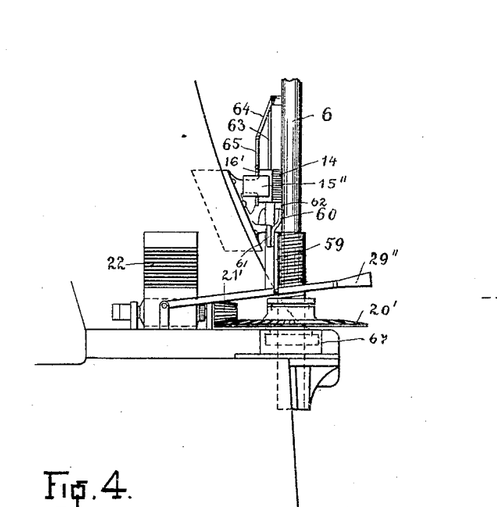
Fig. 4 is a side elevation of a portion of a steam-engine, as in Figs. 1 and 2, equipped with a modified construction of the device.
Figure 5:
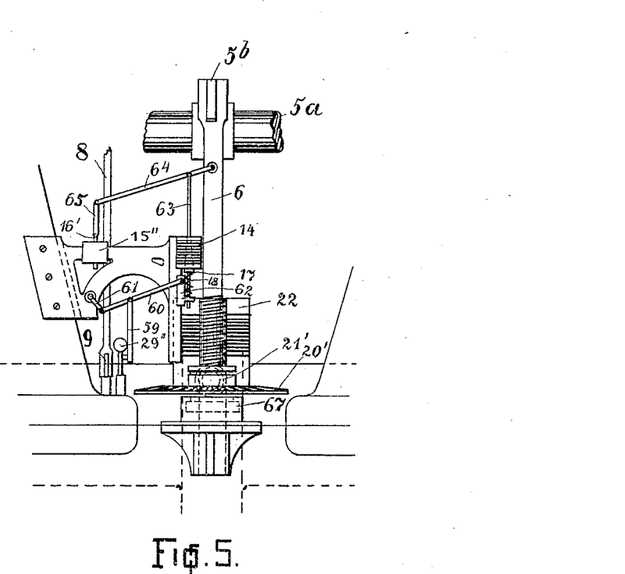
Fig. 5 is a front elevation substantially of that shown in Fig. 4.
Figure 6:
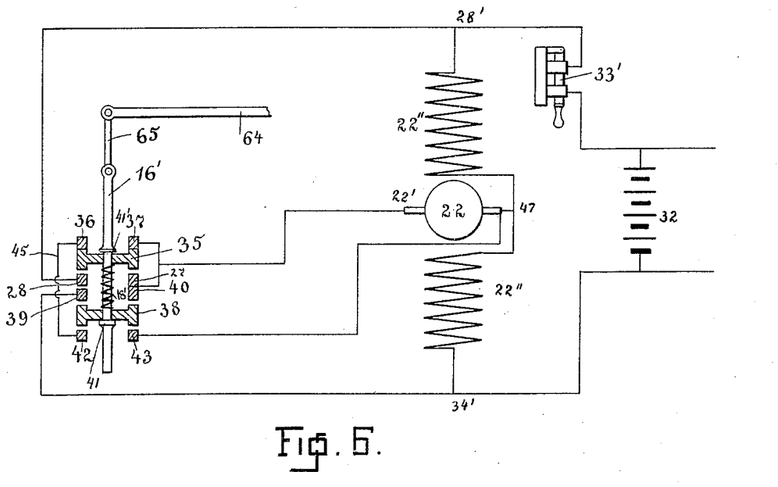
Fig. 6 is a diagram of the electric switches, circuit-closers, and other principal electrical features involved in the devices shown in Figs. 4 and 5.

There is a certain modification shown in Figs. 4, 5, and 6. When hand regulation is desired, instead of letting the current pass through the solenoid 14, the mechanism is so arranged that the core 17 may be raised and lowered by means of a handle 29" through intermediate levers 59, 60, and 61. The lever 60, which finally connects with the slide 62, is best seen in Fig. 5, the slide being attached to the rod 63, that passes through the core 17. This rod 63 projects not only below the core, but up above, and is pivoted to a lever 64, which through another lever 65 operates the rod 16', which goes into the contact-box 15", being of internal construction like the contact-boxes 15'. In other words, the construction of both of the boxes 15' in the former figures is found in the contact-box 15", as seen in the diagram in Fig. 6, where the contacts are all numbered the same. The contacts in Fig. 6—namely, 35, 37, 36, 27, 28, 39, 40, 43, 38, and 42—are in Figs. 4 and 5 all included within the single contact-box 15". Instead of a worm and worm-wheel, as in Figs. 4 and 5, the rod 6 is geared by a bevel-wheel 20' and bevel-pinion 21' to the motor 22. To prevent the bevel-wheel 20' from moving upward when it is turned, instead of moving the rod 6 in one direction or the other there is a circular guide-nut 67.

In order to operate the solenoid-core 17 by hand instead of by electricity, the handle 29" is pushed upward or downward, so that the levers 59 60 and the core-support 62 will be operated, and also the rod 63 will be depressed or elevated, causing the contact-carrier 16' to be moved properly for the purpose of bringing into the electric circuit one or more of the contacts shown in diagram Fig. 6. These contacts are numbered 35, 36, 37, 42, 43, 27, 28, 38, 39, and 40, and they correspond to the same contacts in Fig. 3, but they are all brought together into one box 15". If, for example, the rod 16' is elevated, the connecting-conductor 38 joins the contact-points 39 and 40, so that the circuit is closed through the motor 22. If the contact-carrier 16' is depressed, the contact 38 is brought into connection with the contacts 42 and 43, so that the armature is short-circuited, and thereby bringing the motor to a short stop. Now when the rod 16' is further depressed the circuit is broken at the contacts 36 and 37 and this opens the circuit of the motor. The circuit of the motor now becomes closed again and the poles change to different poles of the circuit, because contact 35 comes in contact with the terminals 28 and 27. Now if the carrier 16' is again elevated a similar operation takes place, the same as if it were manipulated by the action of the electric current through the solenoid 14.

Figure 6A:
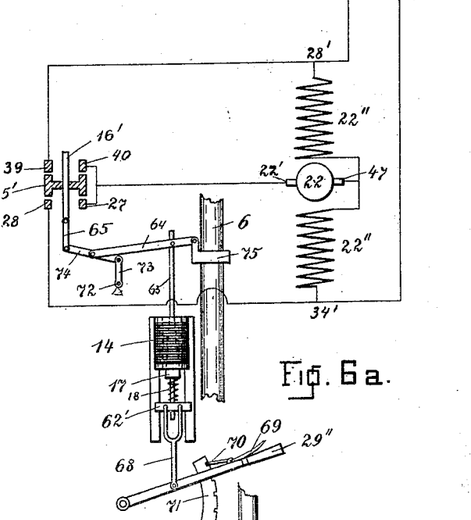

The lever 29" may be attached in some cases directly to the armature-core 17 by the intermediate slide-nut 62' and connecting-rod 68. (Shown in Fig. 6ª.) The pawl 69 upon the handle 29" may be placed in any of the notches 70, arranged along the support 71. The system of levers above the solenoid 14 is a little different, because a stationary pivot is at 72 and supports a rod 73, which connects with a lever 74, which in turn is pivoted to the lever 64, which finally is pivoted to the ring 75 upon the rod 6, while the rod 74 is also linked to the rod 16' through the intermediate connection 65.

In Fig. 6ª another modification is shown, because of the single contact-box, which would contain the contacts 27, 28, 39, 40, and 35'. By the movement up and down of the conductor 35' the circuit would be closed either through the contacts 27 and 28 to turn the motor in one direction or through the contacts 39 and 40 to turn the motor in the other direction.

Figure 7:
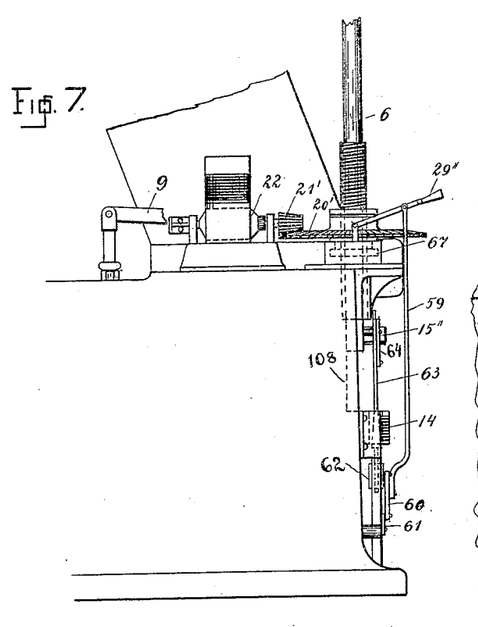
Figs. 7, 8, and 9 are similar views of another modification to those shown in Figs. 4, 5, and 6.
Figure 8:
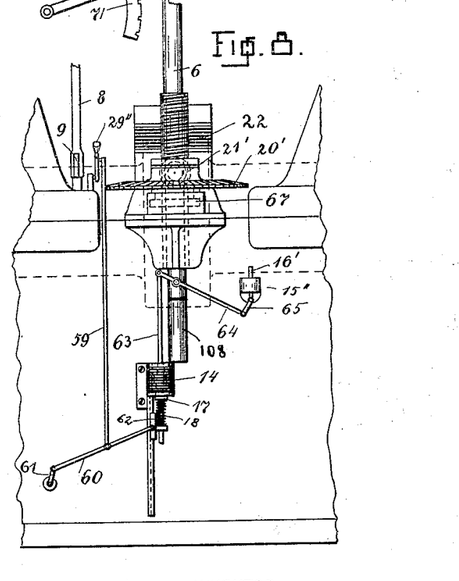
Figure 9:
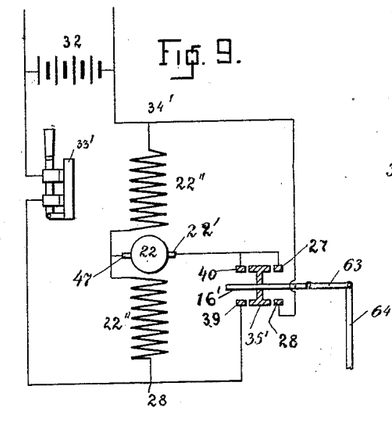

In Figs. 7, 8, and 9 is shown another arrangement of the parts already shown in Figs. 4, 5, 6, and 6ª. No new parts are introduced, the action being precisely similar to that of Figs. 4, 5, and 6, excepting that the contact-box shown in these figures is replaced by the more simple one of Fig. 6ª, while the mechanical stopping device described in the previous paragraph is shown at 78. In these figures the lever 64 is attached to the rod 6 below the bevel-nut 20', and all the rest of the mechanism attached directly to the frame of the engine in corresponding positions. 108 is a recess for receiving the rod 6.

The remaining details are as follows: Referring to Figs. 1ª, 1ᵇ, 1ᶜ, and 1ᵈ, the mechanical construction is seen to be somewhat modified over that represented in Figs. 3 and 6, especially in that the short-circuiting terminals for the motor are arranged outside of the contact-boxes at 83 and 84, as hereinafter explained. The detail of the contact-boxes 15''' is shown at Figs. 1ᵇ, 1ᶜ, and 1ᵈ, Fig. 1ᶜ being a longitudinal vertical section, as shown by the line C D, and Figs. 1ᵇ and 1ᵈ being transverse sections, as shown by the line A B, the former looking toward the left of that line, (or upper portion of the contact-box,) the latter to the right of it, (or lower portion.) The upper contact-box, as shown, consists of an insulating-cylinder 91, closed at one end, to which end are fastened the terminals 85 and 87, the former being connected to the pole 22' of the armature of the motor 22, the latter to the positive pole of the battery 32. To the lower side of 91 are also fastened the conductors 93 and 94. Also the rod 16 carries an insulating-disk 92, bearing the conductors 95, 96, and 97, so placed that on proper motion of the rod 16 their extremities shall come into contact with those of the terminals 85 and 87 and of the conductors 93 and 94. Now when such motion of the rod 16 takes place the circuit will be closed between the terminals 85 and 87, so as to cause the armature of the motor 22 to revolve, the path of the current through the contact-box being as follows: from the terminal 87 to the extremity 98 of the conductor 95, to its opposite extremity 99, to the extremity 100 of the conductor 93, to its opposite extremity 101, to the extremity 102 of the conductor 96, to its opposite extremity 103, to the extremity 104 of the conductor 94, to its opposite extremity 105, to the extremity 106 of the conductor 97, to its opposite extremity 107, and finally to the terminal 85. Similarly upon opposite motion of the rod 16 the circuit will be broken in the upper contact-box and made in the lower one, so that the current will pass from the terminal 86 (which is connected to the pole 22' of the armature of the motor 22) to the terminal 88, connected to the negative pole of the battery 32, and as the circuit in either contact-box 15''' will be broken simultaneously at six different points all danger from arcing will be practically eliminated.

Figure 1A:
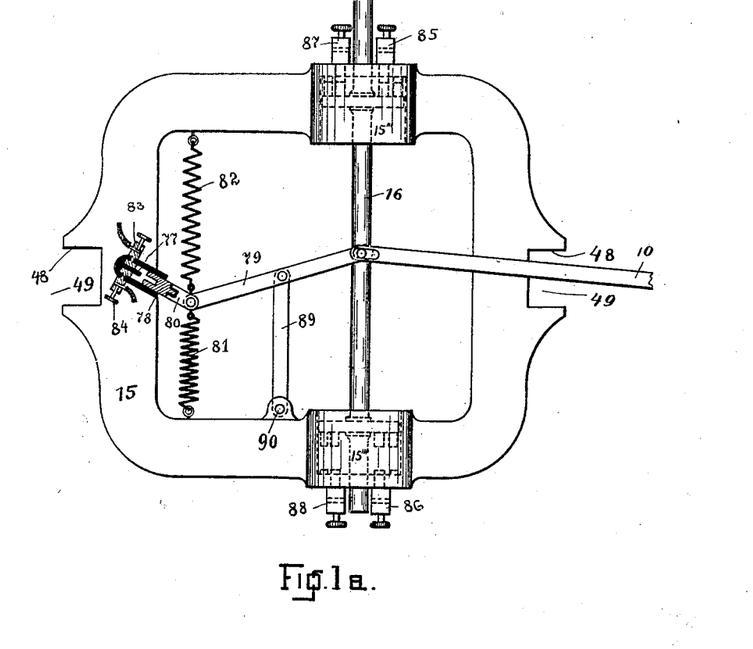
Figure 1B:
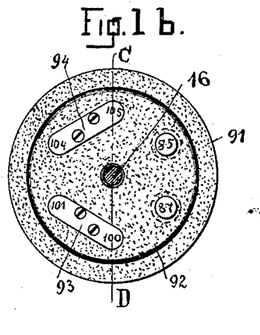
Figure 1C:
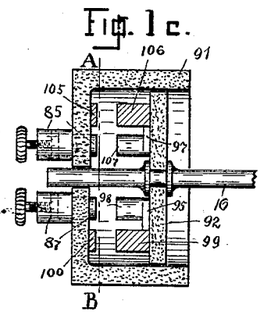
Figure 1D:
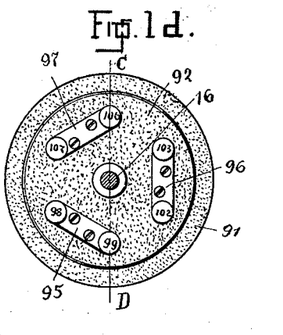

The device shown at the left of the rod 16 in Fig. 1ª for short-circuiting or joining the terminals of the armature when the rod 16 is in its middle position is thus operated: The lever 79 is pivoted to the rod 89, which is in turn pivoted at 90 to the frame 15. One arm is given a vertical motion by the rod 16, while the other is attached to the plunger 80, carrying the conductor 78, insulated from it, the motion of 79 causing the conductor 78 to enter or to be withdrawn from the oscillating insulated cylinder 77. At the bottom of this cylinder are situated two terminals 83 and 84, which are connected, respectively, to the two terminals 22' and 47 of the armature of the motor 22 and so placed that only when the conductor 78 is thrust into the cylinder 77 can it join the two terminals 83 and 84 and so short-circuit the armature. As will be seen from the arrangement of the several parts, this can only happen when the rod 16 is in its central position. The weight of the several parts is counterbalanced, if necessary, by the light springs 81 and 82.

The link 5 for controlling the slide-valve of the engine and controlled in its position by the rod 6 may in more general terms be called a "regulator," because it governs indirectly the quantity and pressure of the steam admitted to the piston.

I claim as my invention—

1. The combination with a steam controlling valve of a rod, 6, for regulating the limits of motion of the same, a dynamo driven by the steam engine, a solenoid in circuit with the said dynamo and provided with a movable core resisted by a retractile spring, a lever pivoted to the rod, 6, and having one arm pivoted to the core and the other arm to a circuit controller, an electric motor adapted to move the rod, 6, to different positions and controlled, as to its circuits, by the said circuit controller.

2. The combination with the valve of a steam engine of a threaded rod, 6, for adjusting the limits of motion of the same, an electric motor provided with a worm upon its shaft, a worm wheel engaging with a threaded rod, 6, and with the worm, a dynamo driven by the steam engine and operating translating devices, a solenoid in circuit with the dynamo and having a core whose movements control the currents fed to the said motor by means of a circuit controller consisting of a rod, 16, carrying movable circuit closers 35 and 38, adapted by the movements of the rod, 16, to come in contact with electric terminals arranged for respectively driving the motor in a given direction, in the reverse direction, or for short circuiting the armature of the same.

3. The combination with the valve of a steam engine of an electric motor geared thereto through a longitudinally reciprocating rod, 6, an electric circuit controller for governing the currents of the electric motor, a lever pivoted to the rod, 6, and having one arm controlling the said circuit controller and having the other arm controlled by a given device.

4. The combination with the valve of a steam engine of an electric motor geared thereto through a longitudinally reciprocating rod, 6, an electric circuit controller for governing the currents of the electric motor, a lever pivoted to the rod, 6, and having one arm controlling the said circuit controller and having the other arm controlled by an electro magnetic device in circuit with a dynamo driven by the said steam engine.

5. The combination with the valve of a steam engine of a rod, 6, for adjusting the position of the valve through intermediate mechanism and having threads turned upon the same, a beveled wheel nut workable upon the threads, an electric motor having a beveled pinion gearing with the beveled wheel, a circuit controller for the electric motor, one of whose operating levers is pivoted to the said rod and to a core of a given solenoid, an electric generator driven by the steam engine and having its main circuit passing through the said solenoid, and an operating device connected to the core.

6. The combination of an insulated rod, 16, having shoulders 41 41', electric conductors 35 and 38 between the shoulders and pressed respectively against the same by yielding springs, an electric motor, main line terminals 28 and 39 for the motor lying respectively in the path of the conductors 35 and 38, and both being between said conductors, the terminals 27 and 40 of the one pole of the armature of the motor being similarly located, the terminals 37 and 43 of the armature of the motor lying in the path respectively of the conductors 35 and 38 and respectively beyond the conductors measured from a point between the same, terminals 36 and 42 electrically connected by a wire 45 and similarly located to the terminals 37 and 43 with respect to the conductors 35 and 38, and means for reciprocating the rod, 16, the terminals of the field magnet being respectively connected to the terminals of the main line.

7. The combination of an adjustable slide valve rod 1, for admitting and cutting off steam from the cylinder of a given steam engine, a radius rod 2, to which the rod 1, is pivoted, and which is provided with a pin, 3, mounted upon the slide 4, which works in a slotted adjustable link, 5, and a rod 6, pivoted to the link 5, through intermediate connecting-rods, the said rod, 6, being provided with means for reciprocating it longitudinally.

8. The combination of an adjustable slide valve rod 1, for admitting and cutting off steam from the cylinder of a given steam engine, a radius rod, 2, to which the rod 1, is pivoted, and which is provided with a pin, 3, mounted upon the slide 4, which works in a slotted adjustable link, 5, and a rod 6, pivoted to the link, 5, through intermediate connecting-rods, the said rod, 6, being provided with means for reciprocating it longitudinally, said means consisting of gearing operated by an electric motor, a solenoid in circuit with a dynamo driven by the steam engine, a movable core for the solenoid, controlling a lever, 10, which is removable, pivoted to the rod, 6, an electric circuit closer controlling the currents of the electric motor and controlled by the said lever 10.

9. The combination of an adjustable slide valve rod, 1, for admitting and cutting off steam from the cylinder of a given steam engine, a radius rod, 2, to which the rod, 1, is pivoted, and which is provided with a pin, 3, mounted upon the slide, 4, which works in a slotted adjustable link, 5, which is turned about the trunnion 5ª by means of the lever 5ᵇ, connected to a rod, 6, through an intermediate connecting rod, 7, the said rod, 6, being provided with means for reciprocating it longitudinally, said means consisting of gearing operated by an electric motor, a solenoid in circuit with a dynamo driven by the steam engine, a movable core for the solenoid, controlling a lever, 10, which is removable, pivoted to the rod, 6, an electric circuit closer controlling the currents of the electric motor and controlled by the said lever 10.

10. The combination with a machine, a regulator whereof requires intermittent reciprocation, according to variable outside work, of an electric motor whose armature is mechanically connected therewith, an electric switch controlling the direction of the rotation of the armature, and a lever pivoted on the reciprocating regulator, the lever being connected with the said electric switch, and with a device to alter the position of the lever according to the variable outside work, for the purpose as set forth and in such a manner that any given alteration of the position of said device will cause the motor to drive the reciprocating regulator into a predetermined position, substantially as herein set forth.

11. The combination with a motor, and with that device thereof which controls the supply of power for driving the motor, of a dynamo driven by the motor, an electro-magnetic mechanism in circuit with the dynamo and connected mechanically to the device, an electric circuit controller, controlled by the electro-magnetic mechanism and connected mechanically to the said device, and an electric motor in circuit with the circuit controller, for changing the positions of the said device.

12. The combination with a motor, such as a steam engine, and with that device thereof which controls the supply of power for driving the engine, of a dynamo driven by the engine, and electro-magnetic mechanism in circuit with the dynamo, an electric motor, a pole changer for controlling the circuits of the electric motor, and controlled by the said electro-magnetic mechanism, the electric motor being mechanically connected with the pole changer and geared to the said device, for the purpoes as set forth of controlling the positions thereof.

13. The combination with a machine, of a regulator therefor, adapted to reciprocate intermittently, an electric motor for governing the position of the regulator, an electric switch controlling the circuits of the electric motor, a lever whose fulcrum is mechanically supported by said regulator controlling the said switch, and means for adjusting the lever to different positions.

14. The combination with a machine, of a regulator therefor, adapted to reciprocate intermittently, an electric motor for governing the position of the regulator, an electric switch controlling the circuits of the electric motor, a lever whose fulcrum is mechanically supported by said regulator and controlling the said switch, and means for adjusting the lever to different positions.

In testimony that I claim the foregoing as my invention I have signed my name, in presence of two witnesses, this 28th day of January, 1895.

GEORGE W. COLLES, JR. [L. S.]

Witnesses:
    EDWARD P. THOMPSON,
    EMMA C. DEGHUIL.